United States Patent
Sato (10) Patent No.: US 6,469,107 B1
(45) Date of Patent: Oct. 22, 2002

(54) ION-CONDUCTIVE POLYMER ELECTROLYTE COMPOSITION OF POLYGLYCIDOL

(75) Inventor: Takaya Sato, Chiba (JP)

(73) Assignee: Nissihinbo Industries, Inc., Tokyo (JP)

( * ) Notice: Subject to any disclaimer, the term of this patent is extended or adjusted under 35 U.S.C. 154(b) by 0 days.

(21) Appl. No.: 09/622,348

(22) PCT Filed: Dec. 15, 1999

(86) PCT No.: PCT/JP99/07039

§ 371 (c)(1),
(2), (4) Date: Aug. 16, 2000

(87) PCT Pub. No.: WO00/36017

PCT Pub. Date: Jun. 22, 2000

(30) Foreign Application Priority Data

Dec. 17, 1998 (JP) ............................................. 10-358825

(51) Int. Cl.$^7$ ............................ C08L 71/02; H01M 6/18
(52) U.S. Cl. ......................... 525/404; 429/309; 429/312
(58) Field of Search .......................... 525/404; 429/309, 429/312

(56) References Cited

U.S. PATENT DOCUMENTS 4,597,838 A    7/1986    Bammel ..................... 204/44.2

FOREIGN PATENT DOCUMENTS

| EP | 0 757 397 A1 | 2/1997 |
| EP | 0 825 662 A2 | 2/1998 |
| EP | 0 885 913 A1 | 2/1998 |
| JP | A2-38451 | 2/1990 |
| JP | A2 2-95004 | 12/1990 |
| JP | 5-25353 A | 2/1993 |
| JP | A10-204172 | 8/1998 |

OTHER PUBLICATIONS

Ogata et al., Journal of Japan Textile Society, 46 (2), pp. 52–57, (1990). Abstract only.

*Primary Examiner*—Robert E. L. Sellers
(74) *Attorney, Agent, or Firm*—Birch, Stewart, Kolasch & Birch, LLP (57) ABSTRACT

An ion-conductive polymer electrolyte composition comprising a polymeric polyol such as polyglycidol or a derivative thereof, an ion-conductive salt and a crosslinkable functional group-bearing compound is used to prepare an ion-conductive solid polymer electrolyte having a high ionic conductivity and a semi-interpenetrating polymer network structure.

13 Claims, 3 Drawing Sheets

ION-CONDUCTIVE POLYMER ELECTROLYTE COMPOSITION OF POLYGLYCIDOL

This application is the national phase under 35 U.S.C. §371 of PCT International Application No. PCT/JP99/07039 which has an International filing date of Dec. 15, 1999, which designated the United States of America.

This application is the national phase under 35 U.S.C. §371 of PCT International Application No. PCT/JP99/07039 which has an International filing date of Dec. 15, 1999 which designated the United States of America, the entire contents of which are hereby incorporated by reference.

BACKGROUND OF THE INVENTION

1. Field of the Invention

This invention relates to ion-conductive polymer electrolyte compositions having a high electrical conductivity, and ion-conductive solid polymer electrolytes endowed with high conductivity and excellent shape retention.

2. Prior Art

Electrolytes used in secondary cells (batteries) and capacitors, for example, have up until now been primarily low-molecular-weight substances that are liquid at or above room temperature, such as water, ethylene carbonate, propylene carbonate, and tetrahydrofuran. In lithium-type cells in particular, use is commonly made of low-molecular-weight organic liquid electrolytes which tend to evaporate, ignite and burn rather easily. To ensure long-term stability, it is necessary to use a metal can as the outer cell enclosure and to increase the airtightness of the container. The result is a considerable rise in the weight of electrical and electronic components that use low-molecular-weight organic liquid electrolytes, and greater complexity of the production process.

Electrolytes can also be made of polymers. Such electrolytes have a very low volatility and thus are not prone to evaporation. Moreover, polymer electrolytes, as these are known, with a sufficiently high molecular weight can even be used as solid electrolytes that exhibit no fluidity at or above room temperature. They have the dual advantage of serving as a solvent for ion-conductive salts and of solidifying the electrolyte.

As an example of this type of polymer electrolyte, in 1978, Armond et al. at l'Université de Grenoble in France discovered that lithium perchlorate dissolves in solid polyethylene oxide, and reported that when the concentration of 1 M lithium salt is dissolved in polyethylene oxide having a molecular weight of about 2,000, the resulting complex shows an ionic conductivity of about $10^{-7}$ S/cm at room temperature. Other groups also reported that when the concentration of 1 M lithium salt is dissolved at room temperature in liquid polyethylene oxide having a molecular weight of about 200, the ionic conductivity at room temperature is about $10^{-4}$ to $10^{-5}$ S/cm. Thus, it is known that polymeric substances such as polyethylene oxide with the ability to dissolve ion-conductive salts function as electrolytes.

Since then, similar research has been carried out on a broad range of largely polyethylene oxide-related polymeric substances, such as polypropylene oxide, polyethyleneimine, polyurethanes and polyesters.

The most thoroughly investigated of these substances, polyethylene oxide, is a polymer having a good ability to dissolve ion-conductive salts as noted above, but at the same time, a semi-crystalline polymer. Because of the latter nature, when a large amount of metallic salt is dissolved in polyethylene oxide, the salt forms a pseudo-crosslinked structure between the polymer chains that leads to crystallization of the polymer. As a result, the ionic conductivity is much lower than predicted.

The reason is as follows. When an ion conductor is dissolved in a linear polyether-based polymer matrix such as polyethylene oxide, the ion conductor migrates, at temperatures above the glass transition temperature of the polymer matrix, through amorphous regions of the polymer matrix along with the local movement of polymer chain segments. Since the cations accounting for ionic conductivity are strongly coordinated by the polymer chains, the local movement of the polymer chains has a strong influence on cation mobility. That local movement of polymer chains is called Brawnian motion.

Therefore, a linear polyether-based polymer such as polyethylene oxide is a poor choice as the matrix polymer for an ion-conductive polymer electrolyte. In fact, according to the literature to date, ion-conductive polymer electrolytes composed entirely of linear polymers such as polyethylene oxide, polypropylene oxide or polyethyleneimine generally have an ion conductivity at room temperature of about $10^{-7}$ S/cm, and at best no more than about $10^{-6}$ S/cm.

To obtain ion-conductive polymer electrolytes having a high conductivity, a molecule must be designed which allows the existence within the matrix polymer of many amorphous regions conducive to ion conductor mobility, and which does not crystallize even with the dissolution therein of ion-conductive salts to a high concentration.

One such method is the attempt to introduce a branched structure into polyethylene oxide, as described in N.Ogata et al., Journal of the Japan Textile Society, pp. 52–57, 1990. Their work demonstrates that ion-conductive solid polymer electrolytes composed of a polyethylene oxide derivative having a high ionic conductivity (about $10^{-4}$ S/cm at room temperature) can indeed be synthesized. However, commercialization of such polymer electrolytes has not been achieved due to the sheer complexity of the method of polymer synthesis involved.

There have also been reports on methods of attaining ion conductivity by imparting to the matrix polymer a three-dimensional network structure so as to impede the formation of a crystalline structure. One example of the use of a polymer having a three-dimensional network structure as the polymer matrix is a method of polymerizing an acrylic monomer or methacrylic monomer containing a polyoxyalkylene component as disclosed in JP-A 5-25353. This method, however, has a number of problems including the low solubility of the ion-conductive salt in the monomer, which necessitates the addition of a third component such as vinylene carbonate, and the low physical strength of the resulting polymer.

SUMMARY OF THE INVENTION

Therefore, one object of the present invention is to provide an ion-conductive solid polymer electrolyte composition having a high conductivity. Another object of the invention is to provide an ion-conductive solid polymer electrolyte having a high conductivity, a semi-interpenetrating polymer network (semi-IPN) structure, and excellent shape retention.

The inventor has discovered that an ion-conductive polymer electrolyte composition composed primarily of a polymeric compound containing certain specific units, an ion-conductive salt, and a compound bearing crosslinkable functional groups has a high ion conductivity. The inventor has also found that this composition can be used to prepare an ion-conductive solid polymer electrolyte having a semi-IPN structure wherein molecular chains on the polymeric compound are entangled with a three-dimensional polymer network structure formed by crosslinking the crosslinkable functional group-bearing compound, and containing the ion-conductive salt. This polymer electrolyte has a dramatically improved shape retention. Moreover, because the matrix is amorphous rather than crystalline, the polymer electrolyte is endowed with a high ion conductivity, giving it an excellent performance as an ion-conductive solid polymer electrolyte.

Accordingly, the invention provides an ion-conductive polymer electrolyte composition comprising:

(A) a polymeric compound containing a unit of the following formula (1) and a unit of the following formula (2):

(B) an ion-conductive salt, and
(C) a compound having crosslinkable functional groups.

The invention also provides an ion-conductive solid polymer electrolyte prepared from the foregoing composition, wherein the polymer electrolyte has a semi-interpenetrating polymer network structure in which molecular chains on the polymeric compound (A) are entangled with a three-dimensional polymer network structure formed by crosslinking the crosslinkable functional group-bearing compound (C), and contains the ion-conductive salt (B).

DETAILED DESCRIPTION OF THE INVENTION

The ion-conductive polymer electrolyte composition of the invention is comprised of:
(A) a polymeric compound having A units of above formula (1), and B units of above formula (2);
(B) an ion-conductive salt; and
(C) a compound with crosslinkable functional groups.

The molecular chain of the polymeric compound (A) can be formed by polymerizing either glycidol or 3-chloro-1,2-propanediol, although it is generally advisable to carry out polymerization using glycidol as the starting material.

Known methods for carrying out the polymerization reaction include:

(1) processes conducted with a basic catalyst such as sodium hydroxide, potassium hydroxide or various amine compounds; and (2) processes carried out with a Lewis acid catalyst (see A. Dworak et al., Macromol. Chem. Phys., 196, 1963–1970 (1995); and R. Toker, Macromolecules, 27, 320–322 (1994)).

Approach (1) involving polymerization with a basic catalyst is often carried out by adding an alcoholic compound (or an active hydrogen compound) as the initiation point, but a high-molecular-weight polymer is difficult to achieve. The reaction mechanism is shown below.

This polymerization process specifically comprises charging a flask with a predetermined amount of glycidol, adding methylene chloride as the solvent, setting the system to a predetermined temperature, adding a predetermined amount of potassium hydroxide as the catalyst, and stirring to effect the reaction. An active hydrogen compound may be included in the reaction mixture if necessary. After reaction completion, methanol is added to stop the reaction, following which the methanol and methylene chloride are driven off in vacuo. The resulting polymer is dissolved in water and neutralized using an ion-exchange resin, following which the ion-exchange resin is removed by filtration. Water is driven from the filtrate in vacuo, and the residue is dried, yielding polyglycidol.

Examples of the active hydrogen compound that may used here include alcohols such as ethanol, methanol, isopropanol and benzyl alcohol; polyols such as glycerol, pentaerythritol, sorbitol, diethylene glycol, ethylene glycol, triose, tetraose, pentose and hexose; and hydroxyl group-bearing polymeric compounds such as polyvinyl alcohol and polyethylene vinyl alcohol.

The molar ratio of (molar quantity of the active hydrogen groups of the additional active hydrogen compounds)/(molar quantity of the additional glycidol) is preferably from 1/10,000 to 1/1, more preferably from 1/1,000 to 1/1, even more preferably from 5/1,000 to 5/10, and most preferably from 1/100 to 1/10.

In approach (2) involving polymerization using a Lewis acid catalyst, the polymerization reaction is carried out in a nonaqueous system. The reaction mechanism is shown below.

-continued

Specifically, this polymerization process is carried out by charging a flask with a predetermined amount of glycidol, using methylene chloride as a solvent if necessary, adding a predetermined amount of catalyst (reaction initiator), and stirring the reaction mixture at a predetermined temperature and under a nitrogen stream to thereby effect reaction. Following reaction completion, methanol is added to stop the reaction, and the methanol and methylene chloride are distilled off in vacuo. The resulting polymer is dissolved in water and neutralized with sodium hydrogencarbonate, following which the solution is passed through an ion-exchange resin-filled column. The eluate is filtered, water is driven from the filtrate in vacuo, and the residue is dried, yielding polyglycidol.

Examples of the catalyst or reaction initiator used in this process include trifluoroborate diethyl etherate ($BF_3 \cdot OEt_2$), $SnCl_4$ and $HPF_6 \cdot OEt_2$. Here, "Et" refers to ethyl group.

Figure 1:
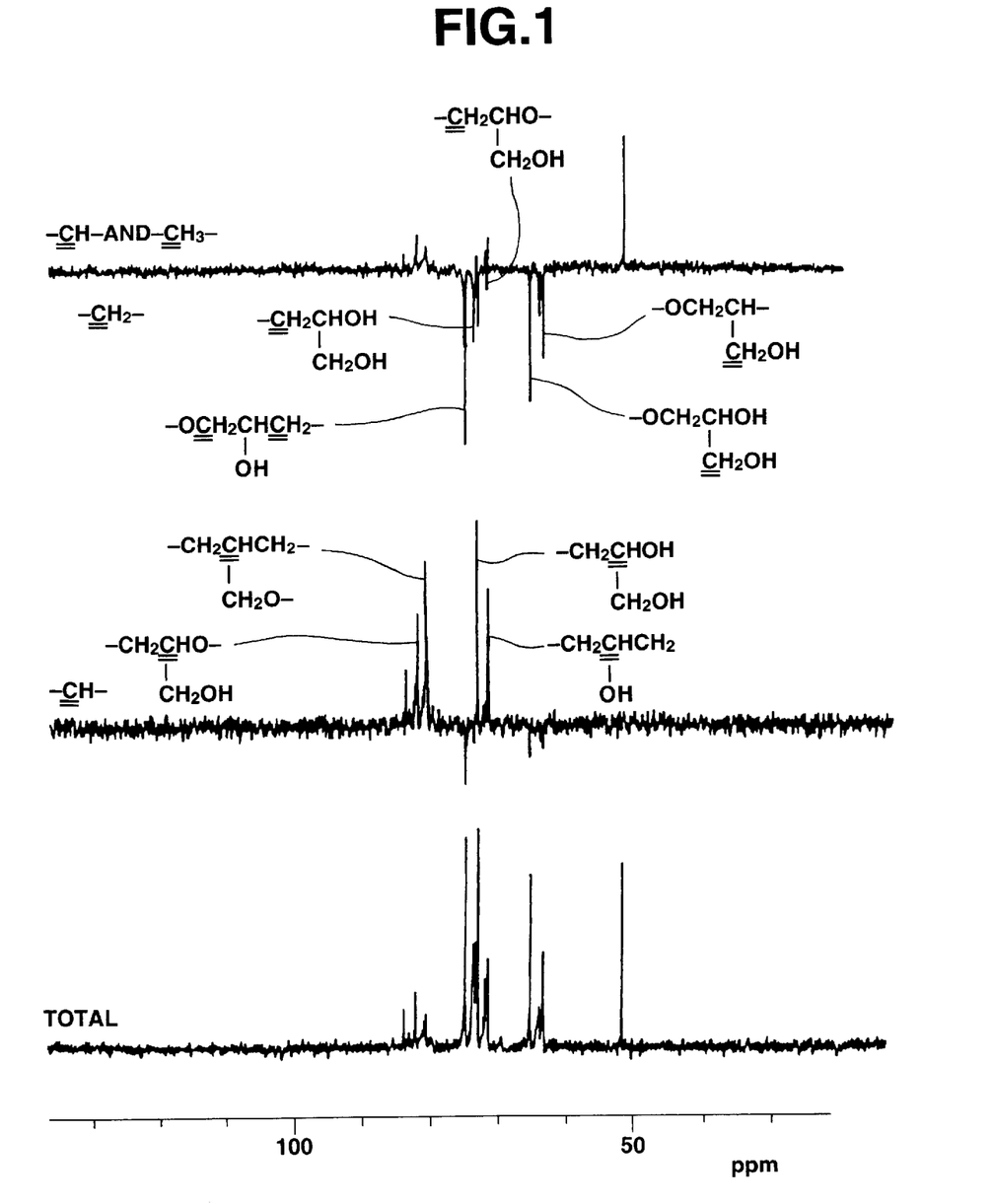
FIG. 1 is the $^{13}$C-NMR spectrum of the polyglycidol prepared in Synthesis Example 1.

It is confirmed by spectroscopic analysis that the resulting polyglycidol is composed of two units A and B. Specifically, the $^{13}C$-NMR spectrum (DEPT spectrum measured with a Varian VXR-300 NMR spectrometer, using $D_2O$ as the solvent) of the resulting polyglycidol includes peaks for carbons belonging to the two units A and B as shown in FIG. 1.

The total number of units A and B in the polyglycidol molecule is at least two, preferably at least six, and most preferably at least ten. No particular upper limit is imposed on the total number of these A and B units, although the total is preferably not more than 10,000. If the polyglycidol is requested to have fluidity as a liquid, a small total number of A and B units is preferred. On the other hand, if the polyglycidol must have a high viscosity, a large total number is preferred.

The arrangement of these A and B units is random and without regularity. For example, the units may have any of the following arrangements: -A-A-A-, -A-A-B-, -A-B-A-, -B-A-A-, -A-B-B-, -B-A-B-, -B-B-A- and -B-B-B-.

The polyglycidol has a polyethylene glycol equivalent weight-average molecular weight (Mw) of preferably 200 to 730,000, more preferably 200 to 100,000 and especially 600 to 20,000, as determined by gel permeation chromatography (GPC). Polyglycidol having a weight-average molecular weight of up to about 2,000 is a highly viscous liquid that flows at room temperature, whereas polyglycidol with a weight-average molecular weight above 3,000 is a soft, pasty solid at room temperature. The dispersity, defined as weight-average molecular weight divided by number-average molecular weight (Mw/Mn), of the polyglycidol is preferably from 1.1 to 20, and more preferably from 1.1 to 10.

Depending on its molecular weight, the polyglycidol varies in appearance at room temperature (20° C.) from a highly viscous taffy-like liquid to a rubbery solid. The higher the molecular weight, the more it qualifies as a solid (albeit, a soft, paste-like solid) having a low fluidity at room temperature.

The polyglycidol, regardless of its molecular weight, is not a linear polymer, but rather an amorphous polymer due to the interlocking of its highly branched molecular chains. This is evident from the absence of any peaks in the wide-angle x-ray diffraction pattern that would suggest the presence of crystals.

Figure 2:
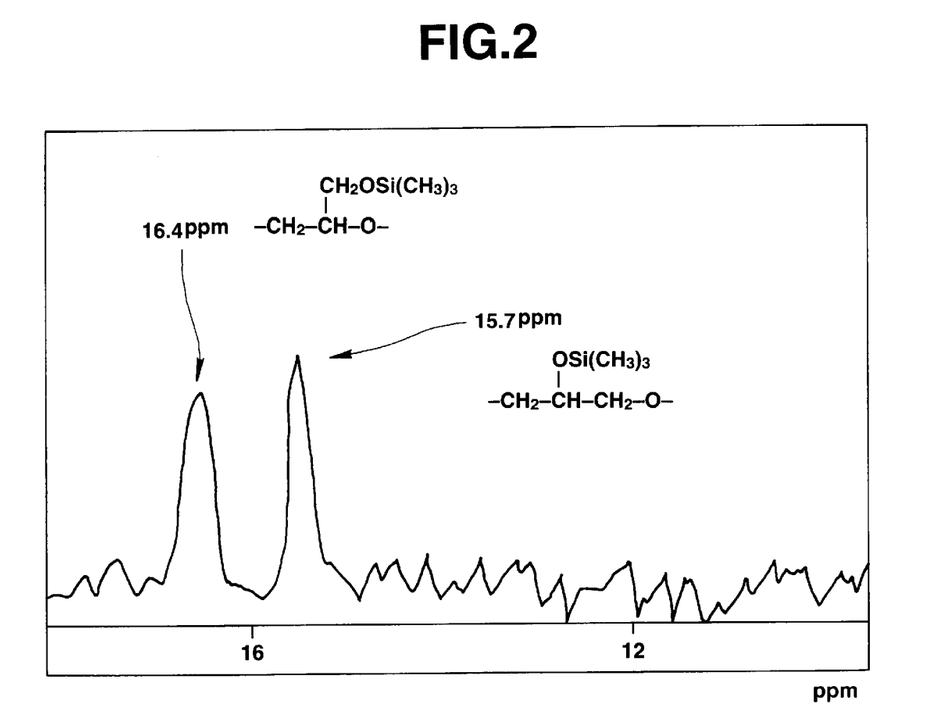
FIG. 2 is the $^{29}$Si-NMR spectrum of a trimethylsilylated polyglycidol obtained from the polyglycidol in Synthesis Example 1.
Figure 3:
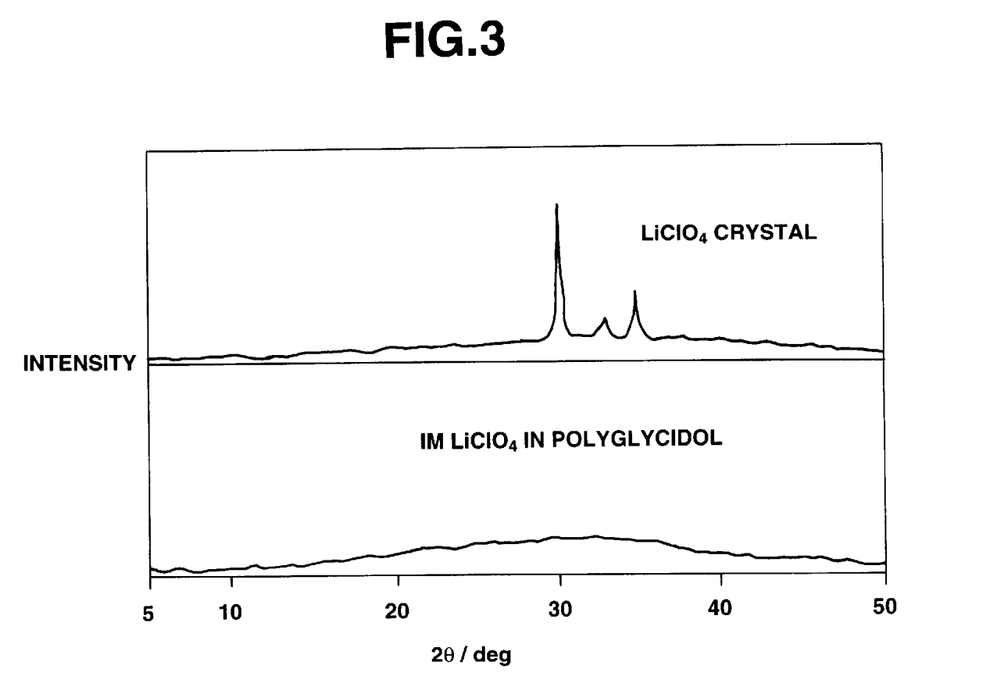
FIG. 3 shows the wide-angle x-ray scattering spectra obtained for lithium perchlorate crystals (top) and for the complex obtained by dissolving a concentration of 1 M lithium perchlorate in polyglycidol having a weight-average molecular weight of 4,000 (bottom).

The ratio of A units and B units in the molecule can be determined by measuring, as shown in FIG. 2, the $^{29}Si$-NMR spectrum for trimethylsilylated polyglycidol prepared by introducing trimethylsilyl groups at the hydroxyl groups on the polyglycidol. The molar ratio of A groups to B groups is preferably from 1/9 to 9/1, and more preferably from 3/7 to 7/3.

Because the polyglycidol is clear, colorless, and nontoxic, it can be used in a broad range of applications, including electrochemical materials (e.g., binders for various electrode-active materials, such as electroluminescent material binders), thickeners, and alkylene glycol substitutes.

Each of the end groups on the molecular chains in the polyglycidol is a hydroxyl group. In the ion-conductive solid polymer electrolyte of the invention, the polymeric compound used as component (A) may be the above-described polyglycidol having a hydroxyl group as each end group on the molecular chain, or it may be a polyglycidol derivative in which some or all of the terminal hydroxyl groups on the polyglycidol have been capped with one or more types of monovalent groups selected from among halogen atoms, substituted or unsubstituted monovalent hydrocarbon groups, $R^1CO$— groups (wherein $R^1$, here and below, is a substituted or unsubstituted monovalent hydrocarbon group), $R^1_3Si$— groups, amino groups, alkylamino groups, $H(OR^2)_m$— groups (wherein $R^2$ is an alkylene group having 2 to 4 carbons, and the letter m is an integer from 1 to 100), and phosphorus-containing groups.

The purpose of capping the end groups on the polyglycidol molecular chains is two-fold.

(1) In polymers containing a high concentration of ion-conductive salts, recombination of free metal cation with paired anion readily arises in the low-dielectric-constant polymer matrix, lowering the conductivity. Because raising the polarity of the polymer matrix discourages ion association, one aim is to increase the dielectric constant of the matrix polymer by introducing polar groups onto the polyglycidol side chains (hydroxyl groups).

(2) The second aim is to impart the polymer electrolyte polymer with highly desirable characteristics, such as hydrophobic properties and fire retardance.

To increase the dielectric constant of the polymeric compound according to the first of these aims, the polyglycidol is reacted with a hydroxyl group-reactive compound, thereby capping the hydroxyl end groups on the polyglycidol molecular chains with highly polar moieties.

The highly polar moieties used for this purpose are not subject to any particular limitation. Examples of preferred moieties include those which are more neutral than ionic moieties, such as substituted or unsubstituted monovalent hydrocarbon groups, $R^1CO$— groups and $H(OR^2)_m$— groups (wherein $R^1$ is a substituted or unsubstituted monovalent hydrocarbon group, $R^2$ is an alkylene group having 2 to 4 carbons, and the letter m is an integer from 1 to 100). If necessary, capping can also be carried out with other suitable moieties, such as amino groups and alkylamino groups.

The second purpose of capping mentioned above, which is to confer hydrophobic properties and fire retardance to the polymeric compound, can be achieved by the use of, for example, halogen atoms, $R^1_3Si$— groups ($R^1$ being as defined above) or phosphorus-containing groups to cap the hydroxyl end groups on the polyglycidol molecular chains.

More specifically, examples of halogen atoms that may be used as the capping moiety include fluorine, bromine and chlorine. Examples of the unsubstituted monovalent hydrocarbon groups having 1 to 10 carbons, and preferably 1 to 8 carbons, that may be used as the capping moiety include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl and xylyl; aralkyl groups such as benzyl, phenylethyl and phenylpropyl; alkenyl groups such as vinyl, allyl, propenyl, isopropenyl, butenyl, hexenyl, cyclohexenyl and octenyl. Examples of the substituted monovalent hydrocarbon groups include any of the above unsubstituted monovalent hydrocarbon groups on which some or all of the hydrogen atoms have been substituted with, among others, halogens (e.g., fluorine, bromine, chlorine), cyano groups, hydroxyl groups, $H(OR^2)_m$— groups ($R^2$ is an alkylene group having 2 to 4 carbons,.and the letter m is an integer from 1 to 100), amino groups, aminoalkyl groups or phosphono groups. Illustrative examples of the latter substituted capping moieties include cyanated alkyl groups (e.g., cyanoethyl, cyanobenzyl), chloromethyl, chloropropyl, bromoethyl, and trifluoropropyl. Any one or combination of two or more of the above capping moieties may be used.

Examples of suitable $R^1CO$— groups include those in which $R^1$ is an unsubstituted monovalent hydrocarbon group having 1 to 10 carbons, and preferably 1 to 8 carbons as exemplified above, and a substituted monovalent hydrocarbon group in which some or all of the hydrogen atoms on the unsubstituted monovalent hydrocarbon groups have been substituted with the substituent group as exemplified above. $R^1$ is preferably an alkyl or phenyl group, such as acyl, benzoyl and cyanobenzoyl groups.

Examples of suitable $H(OR^2)_m$— groups include those in which $R^2$ is an alkylene group having 2 to 4 carbons (e.g., ethylene, propylene, butylene) and the letter m is an integer from 1 to 100, and preferably 2 to 70. Use may also be made of mixtures of two or more from among ethyleneoxy, propyleneoxy and butyleneoxy groups.

Examples of suitable $R^1_3Si$— groups include those in which $R^1$ is as defined above and represents the same unsubstituted monovalent hydrocarbon groups having 1 to 10 carbons, and preferably 1 to 8 carbons, and the same substituted monovalent hydrocarbon groups as above. $R^1$ most preferably stands for an alkyl group. Of these, trialkylsilyl groups, and especially trimethylsilyl groups, are preferred.

Additional examples of suitable capping moieties include amino groups, alkylamino groups and phosphorus-containing groups.

The proportion of end groups capped with the above moieties is preferably at least 10%, more preferably at least 50%, and most preferably at least 90%. Capping of substantially all the end groups (for a capping ratio of about 100%) with the above moieties may even be carried out.

Because there are cases in which the ability of the polymer to dissolve the ion-conductive salt diminishes when all the end groups on the polymer molecular chains are capped with halogen atoms, $R^1_3Si$— groups or phosphorus-containing groups, it is necessary to introduce a suitable amount of capping moieties while paying close attention to the dissolving ability of the polymer. An appropriate amount is 10 to 95%, preferably 50 to 95%, and more preferably 50 to 90%, based on the total number of hydroxyl end groups.

The capping moiety used in the practice of the invention is most preferably a cyanated monovalent hydrocarbon group or a combination of a cyanated monovalent hydrocarbon group with a $R^1_3Si$— group. Illustrative examples include cyanated alkyl groups such as cyanoethyl, cyanobenzyl and cyanobenzoyl, and trimethylsilyl in combination with any of these cyanated monovalent hydrocarbon groups.

When a cyanated monovalent hydrocarbon group such as cyanoethyl is used in combination with a $R^1_3Si$— group such as trimethylsilyl, it is advantageous for the two components to be in relative proportions of 70 to 97%, preferably 90 to 97%, of cyanated monovalent hydrocarbon groups, and 30 to 3%, preferably 10 to 3%, of $R^1_3Si$— groups, based on all the hydroxyl end groups on the molecular chains. Polymers in which cyanated monovalent hydrocarbon groups and $R^1_3Si$— groups are incorporated together in this way possess excellent electrical conductivity and hydrophobic properties.

If cyanoethyl groups are introduced as the capping moiety, the method for capping the polyglycidol molecular chains may comprise mixing the polyglycidol with dioxane and acrylonitrile, adding a sodium hydroxide solution to the mixture, and stirring to effect the reaction. This yields cyanoethylated polyglycidol in which cyanoethyl groups are introduced on some or all of the side chains.

The introduction of acetyl groups as the capping moiety may be carried out by, for example, mixing the polyglycidol with acetic acid and methylene chloride, adding an aqueous perchlorate solution and anhydrous acetic acid to the mixture, then reacting at room temperature under stirring. The reaction mixture is subsequently added to cold water, whereupon a precipitate settles out. The precipitate is collected, dissolved in acetone, then poured once again into water. The resulting mixture is neutralized by adding sodium hydrogen carbonate, and the precipitate that forms is collected by filtration, placed together with water in dialysis tubing and dialyzed with ion-exchanged water. The resulting precipitate is collected, rinsed with water, then dried in vacuo, giving acetylated polyglycidol.

Cyanobenzoyl groups may be introduced as the capping moieties by a method which involves, for example, mixing the polyglycidol with dioxane and adding pyridine, followed by the dropwise addition of a solution of cyanobenzoyl chloride in dioxane. The solution is then reacted at a predetermined temperature, after which the reaction mixture is poured into a methanol/water (3:4) solution. The precipitate that settles out of solution is collected, then dissolved in N,N-dimethylsulfoxide, following which the solution is placed in dialysis tubing and dialyzed. The resulting precipitate is collected, rinsed with water, then dried in vacuo, giving cyanobenzoylated polyglycidol.

The introduction of trimethylsilyl groups may be carried out by dissolving the polyglycidol in dimethylacetamide, adding bis(trimethylsilyl)acetamide to the solution, and stirring at room temperature to effect reaction. The reaction mixture is then cooled in an ice-water bath, and poured into a cold methanol/water (4:1) solution. The precipitate that settles out is collected by filtration, then is dissolved in acetamide and the solution is passed through filter paper. The solution is then dried in vacuo, yielding trimethylsilylated polyglycidol.

Capping with other suitable capping moieties may likewise be carried out using known techniques for introducing those moieties onto terminal hydroxyl groups.

The polyglycidol and various polyglycidol derivatives of component (A) prepared as described above are conferred with ionic conductivity by adding thereto component (B), an ion-conductive salt.

The ion-conductive salt serving as component (B) is not subject to any particular limitation so long as it can be used in conventional electrochemical devices. Illustrative examples include $LiClO_4$, $LiBF_4$, $LiAsF_6$, $LiPF_6$, $LiSbF_6$, $LiCF_3SO_3$, $LiCF_3COO$, $NaClO_4$, $NaBF_4$, $NaSCN$, $KBF_4$, $Mg(ClO_4)_2$, $Mg(BF_4)_2$, $(C_4H_9)_4NBF_4$, $(C_2H_5)_4NBF_4$ and $(C_4H_9)_4NClO_4$. Any one or combinations of two or more of these may be used.

The amount of the ion-conductive salt included in the inventive composition varies empirically according to a number of factors, including the type of ion-conductive salt used, the molecular weight of the polyglycidol or polyglycidol derivative, and the type of capping moiety. In general, the amount of ion-conductive salt included is preferably 5 to 1,000 parts by weight, more preferably 10 to 500 parts by weight, and most preferably 10 to 100 parts by weight, per 100 parts by weight of polyglycidol or polyglycidol derivative. Too little ion-conductive salt may result in a weak concentration of the ion conductor, making the electrical conductivity too low for practical purposes. On the other hand, with the use of too much ion-conductive salt, the capacity of the polymer matrix to dissolve the salt may be exceeded, resulting in salt deposition.

The ion-conductive solid polymer electrolyte of the invention is generally formed into a thin film for use as an electrolyte for solid secondary cells. Thus, a crosslinkable functional group-bearing compound is included in the polymer electrolyte composition as component (C) to impart physical strength for shape retention and other reasons. This compound is reacted to form a three-dimensional network structure and thereby increase the shape-retaining ability of the polymer electrolyte.

In other words, when a mixture of (A) polyglycidol or a polyglycidol derivative and (B) an ion-conductive salt has added thereto (C) a crosslinkable functional group-bearing compound and the latter is reacted, it forms a three-dimensional network structure. The highly branched polyglycidol molecule of component (A) is entangled within this three-dimensional network structure to form a robust, semi-interpenetrating polymer network (semi-IPN) structure. This enhances the compatibility between the different polymer chains and provides a correlating increase in cohesive strength, thus having the overall effect of dramatically increasing the shape retention. Accordingly, by adding component (C) and reacting to form a semi-IPN structure, the shape retention is enhanced, giving a material which is highly suitable for use as a solid polymer electrolyte.

Any of the following may be used as the crosslinkable functional group-bearing compound (C) in the inventive polymer electrolyte composition:

(1) an epoxy group-bearing compound in combination with a compound having two or more active hydrogens capable of reacting with the epoxy group;
(2) an isocyanate group-bearing compound in combination with a compound having two or more active hydrogens capable of reacting with the isocyanate group;
(3) a compound having two or more reactive double bonds.

Illustrative examples of the epoxy group-bearing compound (1) include compounds having two or more epoxy groups in a molecule, such as sorbitol polyglycidyl ether, sorbitan polyglycidyl ether, polyglycerol polyglycidyl ether, pentaerythritol polyglycidyl ether, diglycerol polyglycidyl ether, triglycidyl tris(2-hydroxyethyl) isocyanurate, glycerol polyglycidyl ether, trimethylpropane polyglycidyl ether, resorcinol diglycidyl ether, 1,6-hexanediol diglycidyl ether, ethylene glycol diglycidyl ether, propylene glycol diglycidyl ether, the diglycidyl ether of ethylene-propylene glycol copolymers, polytetramethylene glycol diglycidyl ether, and adipic acid diglycidyl ether.

A semi-IPN structure can be formed by reacting the epoxy group-bearing compound with a compound having at least two active hydrogens, such as an amine, alcohol, carboxylic acid or phenol. Illustrative examples include polymeric polyols such as polyethylene glycol, polypropylene glycol and ethylene glycol-propylene glycol copolymers, and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis(β-hydroxyethoxy)benzene, p-xylylenediol, phenyl diethanolamine, methyl diethanolamine and polyethyleneimine, as well as polyfunctional amines and polyfunctional carboxylic acids.

Illustrative examples of the isocyanate group-bearing compound (2) include compounds having two or more isocyanate groups in a molecule, such as tolylene diisocyanate, xylylene diisocyanate, naphthylene diisocyanate, diphenylmethane diisocyanate, biphenylene diisocyanate, diphenylether diisocyanate, tolidine diisocyanate, hexamethylene diisocyanate and isophorone diisocyanate.

Isocyanato-terminal polyols prepared by reacting the above isocyanate compounds with a polyol can also be used. This type of compound can be prepared by reacting an isocyanate such as diphenylmethane diisocyanate or tolylene diisocyanate with one of the polyols listed below.

In this case, the stoichiometric ratio between the isocyanate groups [NCO] on the isocyanate compound and the hydroxyl groups [OH] on the polyol is such as to satisfy the condition [NCO]>[OH]. The ratio [NCO]/[OH] is preferably in a range of 1.03/1 to 10/1, and especially 1.10/1 to 5/1.

Suitable examples of the polyol include polymeric polyols such as polyethylene glycol, polypropylene glycol and ethylene glycol-propylene glycol copolymers; and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis-(β-hydroxyethoxy)benzene, p-xylylenediol, phenyl diethanolamine, methyl diethanolamine and 3,9-bis(2-hydroxy-1,1-dimethyl)-2,4,8,10-tetraoxaspiro[5,5]-undecane.

Alternatively, instead of the polyol, an amine having two or more active hydrogens may be reacted with the isocyanate. An amine having a primary or secondary amino group may be used, although a primary amino group-bearing compound is preferred. Suitable examples include diamines such as ethylenediamine, 1,6-diaminohexane, 1,4-diaminobutane and piperazine; polyamines such as polyethyleneamine; and amino alcohols such as N-methyldiethanolamine and aminoethanol. Of these, diamines in which the functional groups have the same reactivities are especially preferred.

In this case, the stoichiometric ratio between the isocyanate groups [NCO] on the isocyanate compound and the amino groups [NH$_2$], [NH] on the amine compound is such as to satisfy the condition [NCO]>[NH$_2$]+[NH].

Such isocyanate group-bearing compounds cannot by themselves form a semi-IPN structure. Such a structure can be formed by reacting an isocyanate group-bearing compound with a compound having at least two active hydrogens, such as an amine, alcohol, carboxylic acid or phenol. Illustrative examples include polymeric polyols such as polyethylene glycol, polypropylene glycol and ethylene glycol-propylene glycol copolymers, and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene-glycol, 1,4-cyclohexanedimethanol, 1,4-bis(β-hydroxyethoxy)benzene, p-xylylenediol, phenyl diethanolamine, methyl diethanolamine and polyethyleneimine, as well as polyfunctional amines and polyfunctional carboxylic acids.

Illustrative examples of above compound (3) having a reactive double bond which may be used as the crosslinkable functional group-bearing compound (C) in the inventive polymer electrolyte composition include compounds having two or more reactive double bonds in a molecule, such as divinylbenzene, divinylsulfone, allyl methacrylate, ethylene glycol dimethacrylate, diethylene glycol dimethacrylate, triethylene glycol dimethacrylate, polyethylene glycol dimethacrylate (average molecular weight, 200 to 1,000), 1,3-butylene glycol dimethacrylate, 1,6-hexanediol dimethacrylate, neopentyl glycol dimethacrylate, polypropylene glycol dimethacrylate (average molecular weight, 400), 2-hydroxy-1,3-dimethacryloxypropane, 2,2-bis[4-(methacryloxyethoxy)phenyl]propane, 2,2-bis[4-(methacryloxyethoxy-diethoxy)phenyl]propane, 2,2-bis[4-(methacryloxyethoxy-polyethoxy)phenyl]propane, ethylene glycol diacrylate, diethylene glycol diacrylate, triethylene glycol diacrylate, polyethylene glycol diacrylate (average molecular weight, 200 to 1,000), 1,3-butylene glycol diacrylate, 1,6-hexanediol diacrylate, neopentyl glycol diacrylate, polypropylene glycol diacrylate (average molecular weight, 400), 2-hydroxy-1,3-diacryloxypropane, 2,2-bis[4-(acryloxyethoxy)phenyl]propane, 2,2-bis[4-(acryloxyethoxy-diethoxy)phenyl]propane, 2,2-bis[4-(acryloxyethoxy-polyethoxy)phenyl]propane, trimethylolpropane triacrylate, trimethylolpropane trimethacrylate, tetramethylolmethane triacrylate, tetramethylolmethane tetraacrylate, water-soluble urethane diacrylate, water-soluble urethane dimethacrylate, tricyclodecane dimethanol acrylate, hydrogenated dicyclopentadiene diacrylate, polyester diacrylate and polyester dimethacrylate.

If necessary, a compound containing an acrylic or methacrylic group may be added to compound (3). Examples of such compounds include acrylates and methacrylates such as glycidyl methacrylate, glycidyl acrylate and tetrahydrofurfuryl methacrylate, as well as methacryloyl isocyanate, 2-hydroxymethylmethacrylic acid and N,N-dimethylaminoethyl-methacrylic acid. Other reactive double bond-bearing compounds may be added as well, such as acrylamides (e.g., N-methylolacrylamide, methylenebisacrylamide, diacetoneacrylamide), and vinyl compounds such as vinyloxazolines and vinylene carbonate.

Here too, in order to form a semi-IPN structure, a compound having at least two reactive double bonds must be added. That is, a semi-IPN structure cannot be formed using only a compound having but one reactive double bond, such as methyl methacrylate. Some addition of a compound bearing at least two reactive double bonds is required.

Of the above-described reactive double bond-bearing compounds, especially preferred reactive monomers include polyoxyalkylene component-bearing diesters of formula (3) below.

(3)

In formula (3), $R^3$, $R^4$ and $R^5$ are each independently a hydrogen atom or an alkyl group having 1 to 6 carbons, and preferably 1 to 4 carbons, such as methyl, ethyl, n-propyl, i-propyl, n-butyl, i-butyl, s-butyl and t-butyl; and X and Y satisfy the condition X≧1 and Y≧0 or the condition X≧0 and Y≧1. Preferably, $R^3$, $R^4$ and $R^5$ are methyl, ethyl, n-propyl, i-propyl, n-butyl, i-butyl, s-butyl or t-butyl. The sum of X and Y (i.e., X+Y) is preferably 1 to 100, especially 1 to 30.

The use of the polyoxyalkylene component-bearing diester of formula (3) in combination with a polyoxyalkylene component-bearing monoester of formula (4) below is recommended.

(4)

In formula (4), $R^6$, R7 and $R^8$ are each independently a hydrogen atom or an alkyl group having 1 to 6 carbons, and preferably 1 to 4 carbons, such as methyl, ethyl, n-propyl, i-propyl, n-butyl, i-butyl, s-butyl and t-butyl; and A and B satisfy the condition A≧1 and B≧0 or the condition A≧0 and B≧1. Preferably, $R^6$, $R^7$ and $R^8$ are methyl, ethyl, n-propyl, i-propyl, n-butyl, i-butyl, s-butyl or t-butyl. The sum of A and B (i.e., A+B) is preferably 1 to 100, especially 1 to 30.

Typically, a mixture of the polyoxyalkylene component-bearing diester and the polyoxyalkylene component-bearing monoester with the polyglycidol or polyglycidol derivative and the ion-conductive salt is heated or exposed to a suitable form of radiation such as UV light, electron beams, x-rays, gamma rays, microwaves or high-frequency radiation, thereby forming a semi-IPN type three-dimensional crosslinked network structure. The semi-IPN structure can be formed by adding only a polyoxyalkylene component-bearing diester to the polyglycidol or polyglycidol derivative and carrying out polymerization. However, as already noted, the addition of a monofunctional monomer, that is, a polyoxyalkylene component-bearing monoester, to the polyoxyalkylene component-bearing diester is generally preferred because such addition introduces polyoxyalkylene branches onto the three-dimensional network.

No particular limitation is imposed on the relative proportions of the polyoxyalkylene component-bearing diester and the polyoxyalkylene component-bearing monoester, although a weight ratio of (polyoxyalkylene component-bearing diester)/(polyoxyalkylene component-bearing monoester) within a range of 1/1 to 0.5/1, and especially 1/1 to 0.2/1, is preferred because this enhances the film strength when the ion-conductive polymer electrolyte of the invention is formed as a film.

The amount of the crosslinkable functional group-bearing compound (C) formulated in the inventive composition is preferably 10 to 500 parts by weight, more preferably 10 to 150 parts by weight, and most preferably 20 to 100 parts by weight, per 100 parts by weight of the polyglycidol or polyglycidol derivative (A). At less than 10 parts by weight, a sufficient increase in film strength may not be obtained. On the other hand, at more than 500 parts by weight, the ability of the matrix as a whole to dissolve the ion-conductive metallic salt may decline, which can lead to undesirable effects such as settling out of the salt and weakening of the formed film.

In addition to above components (A), (B) and (C), the ion-conductive solid polymer electrolyte composition of the invention may include also an ordinary amount of a solvent capable of dissolving the ion-conductive salt. Suitable examples of such solvents include chain ethers, such as dibutyl ether, 1,2-dimethoxyethane, 1,2-ethoxymethoxyethane, methyl diglyme, methyl triglyme, methyl tetraglyme, ethyl glyme, ethyl diglyme, butyl diglyme, and glycol ethers (e.g., ethyl cellosolve, ethyl carbitol, butyl cellosolve, butyl carbitol); heterocyclic ethers such as tetrahydrofuran, 2-methyltetrahydrofuran, 1,3-dioxolane and 4,4-dimethyl-1,3-dioxane; butyrolactones such as γ-butyrolactone, γ-valerolactone, δ-valerolactone, 3-methyl-1,3-oxazolidin-2-one and 3-ethyl-1,3-oxazolidin-2-one; and solvents commonly used in electrochemical elements, such as water, alcohol solvents (e.g., methanol, ethanol, butanol, ethylene glycol, propylene glycol, diethylene glycol, 1,4-butanediol and glycerol), polyoxyalkylene polyols (e.g., ethylene oxide, polypropylene oxide, polyoxyethyleneoxypropylene glycol and mixtures of two or more thereof), amide solvents (e.g., N-methylformamide, N,N-dimethylformamide, N-methylacetamide and N-methylpyrrolidinone), carbonate solvents (e.g., propylene carbonate, ethylene carbonate, styrene carbonate), and imidazolidinone solvents (e.g., 1,3-dimethyl-2-imidazolidinone). These solvents may be used singly or as mixtures of two or more thereof.

In the practice of the invention, the composition comprising components (A), (B) and (C), in combination with optional ingredients, is heated or exposed to a suitable form of radiation, such as UV light, electron beams, x-rays, gamma rays, microwaves or high-frequency radiation so as to effect the reaction or polymerization of the crosslinkable functional group-bearing compound. The resulting three-dimensional network structure is mutually entangled with molecular chains on the polyglycidol or polyglycidol derivative to form a semi-interpenetrating network structure.

The semi-IPN structure can generally be formed using a radical polymerization reaction. The polymerization reaction may be carried out without the addition of a polymerization initiator (also referred to below as a "catalyst") when electron beam irradiation is used, although an initiator is ordinarily added in other cases.

No particular limitation is imposed on the polymerization initiator or catalyst. Examples of photopolymerization initiators that be used include acetophenone, trichloroacetophenone, 2-hydroxy-2-methylpropiophenone, 2-hydroxy-2-methylisopropiophenone, 1-hydroxycyclohexylketone, benzoin ether, 2,2-diethoxyacetophenone and benzyl dimethyl ketal.

Examples of thermal polymerization initiators that may be used include high-temperature initiators such as cumene hydroperoxide, t-butyl hydroperoxide, dicumyl peroxide and di-t-butylperoxide; conventional initiators such as benzoyl peroxide, lauroyl peroxide, persulfates and azobisisobutyronitrile; low-temperature initiators (redox initiators) such as hydrogen peroxide-ferrous salts, persulfate-acidic sodium sulfite, cumene hydroperoxide-ferrous salts and benzoyl peroxide-dimethylaniline; and also peroxide-organometallic alkyls, triethylboron, diethylzinc, and oxygen-organometallic alkyls.

These polymerization initiators may be used alone or as mixtures of two or more thereof. The initiator or catalyst for the radical reaction is added in an amount within a range of preferably 0.1 to 1 part by weight, and especially 0.1 to 0.5 part by weight, per 100 parts by weight of the crosslinkable functional group-bearing compound (C). The addition of less than 0.1 part by weight may result in a marked decline in the polymerization rate, whereas the addition of more than 1 part by weight has no additional effect and results only in a wasteful use of reagent.

The polymerization reaction conditions are not subject to any particular limitations. In the case of photopolymerization, for example, reaction is typically carried out by 5 to 30 minutes of exposure to 1 to 50 $mW/cm^2$ of UV light at room temperature and in air.

Polymerization by means of e-beam irradiation is carried out at an acceleration voltage of 150 to 300 kV and room temperature. In the case of thermal polymerization, the reaction is effected by heating at 50 to 120° C. for a period of 0.5 to 6 hours.

The polymer formed by polymerization is mutually entangled with molecular chains on the polyglycidol or polyglycidol derivative to give a firm, three-dimensional semi-IPN structure. A crystal structure does not form, and so the matrix is amorphous.

In view of considerations such as the simplicity of the apparatus and running costs, the polymerization reaction is preferably carried out by UV irradiation or thermal polymerization.

The ion-conductive solid polymer electrolyte of the invention has a robust semi-IPN structure wherein polyglycidol or a polyglycidol derivative, which is a highly branched amorphous polymer, is entangled with the three-dimensional network structure of a polymer prepared from a crosslinkable functional group-bearing compound. This greatly increases the shape retention of the polymer electrolyte. Yet, the molecular structure is that of an amorphous polymer, and is not crystalline, allowing free mobility of the ion conductor within the molecule. The result is a high conductivity of about $10^{-3}$ to $10^{-4}$ S/cm at room temperature. Because the inventive polymer electrolyte also has other outstanding characteristics such as flame retardance and is not subject to evaporation or leakage, it lends itself well to use as a solid electrolyte in lithium ion and other types of cells.

The ion-conductive solid polymer electrolyte of the invention may be formed into an electrolyte film of uniform thickness by using a suitable thin film-forming process such as roller coating with an applicator roll, screen coating, doctor blade coating, spin coating or bar coating.

EXAMPLES

The following examples are provided to illustrate the invention, and are not intended to limit the scope thereof. All parts are by weight.

Synthesis Example 1

Polyglycidol Preparation

A flask was charged with glycidol and methylene chloride to a glycidol concentration of 4.2 mol/L, and the reaction temperature was set at −10° C. Trifluoroboratediethyl etherate ($BF_3.OEt_2$) was added as the catalyst (reaction initiator) to a concentration of $1.2 \times 10^{-2}$ mol/L. The mixture was stirred for 3 hours under a stream of nitrogen to effect the reaction. Following reaction completion, methanol was added to stop the reaction, and the methanol and methylene chloride were removed by distillation in a vacuum.

The resulting crude polymer was dissolved in water and neutralized with sodium hydrogencarbonate, after which the solution was passed through a column packed with an ion-exchange resin produced by Organo Corporation under the trade name Amberlite IRC-76. The eluate was passed through 5C filter paper, after which the filtrate was distilled in vacuo and the residue from distillation was dried.

The purified polyglycidol was analyzed by gel permeation chromatography (GPC) using 0.1 M saline as the mobile phase, based upon which the polyethylene glycol equivalent weight-average molecular weight was measured. The crystallinity was determined by wide-angle x-ray diffraction analysis, and the room temperature state of the polymer was visually examined. The results are shown in Table 2. FIG. 1 shows the $^{13}$C-NMR spectrum (DEPT spectrum measured with a Varian VXR-300 NMR spectrometer, using $D_2O$ as the solvent).

Synthesis Examples 2 to 8

Using the quantities, reaction time and temperature shown in Table 1, polyglycidol was prepared in each example by the same method as in Synthesis Example 1.

In each example, the resulting polyglycidol was analyzed by GPC using 0.1 M saline as the mobile phase, based upon which the polyethylene glycol equivalent weight-average molecular weight was measured. The crystallinity was determined by wide-angle x-ray diffraction analysis, and the room temperature state of the polymer was visually examined. The results are shown in Table 2.

TABLE 1

|  | Glycidol conc. (mol/L) | Catalyst | Catalyst conc. (mol/L) | Solvent | Temp. (° C.) | Reaction time (hrs) |
|---|---|---|---|---|---|---|
| Syn. Ex. 1 | 4.2 | $BF_3 \cdot OEt_2$ | $1.2 \times 10^{-2}$ | methylene chloride | −10 | 3 |
| Syn. Ex. 2 | 4.2 | $BF_3 \cdot OEt_2$ | $1.2 \times 10^{-2}$ | methylene chloride | 10 | 3 |
| Syn. Ex. 3 | 4.2 | $BF_3 \cdot OEt_2$ | $1.2 \times 10^{-2}$ | methylene chloride | 30 | 3 |
| Syn. Ex. 4 | 16 | $BF_3 \cdot OEt_2$ | $9.2 \times 10^{-3}$ | none | −10 | 48 |
| Syn. Ex. 5 | 16 | $SnCl_4$ | $1.6 \times 10^{-2}$ | none | −20 | 8 |
| Syn. Ex. 6 | 4.5 | $SnCl_4$ | $8.2 \times 10^{-3}$ | methylene chloride | −20 | 8 |
| Syn. Ex. 7 | 15 | $HPF_6 \cdot OEt_2$ | $9.0 \times 10^{-3}$ | none | −10 | 48 |
| Syn. Ex. 8 | 15 | $HPF_6 \cdot OEt_2$ | $1.8 \times 10^{-3}$ | none | −10 | 56 |

TABLE 2

|  | Weight-average molecular weight | Crystallinity | Room temperature state |
|---|---|---|---|
| Syn. Ex. 1 | 6,250 | amorphous | soft, paste-like solid |
| Syn. Ex. 2 | 3,240 | amorphous | soft, paste-like solid |
| Syn. Ex. 3 | 1,060 | amorphous | viscous liquid |
| Syn. Ex. 4 | 13,940 | amorphous | soft, paste-like solid |
| Syn. Ex. 5 | 9,840 | amorphous | soft, paste-like solid |
| Syn. Ex. 6 | 13,400 | amorphous | soft, paste-like solid |
| Syn. Ex. 7 | 15,370 | amorphous | soft, paste-like solid |
| Syn. Ex. 8 | 21,530 | amorphous | soft, paste-like solid |

Syntheses Example 9

Polyglycidol Preparation

A flask was charged with 100 parts of glycidol and 1,000 parts of methylene chloride, and set at a temperature of 20° C. Potassium hydroxide (20 parts) was added as the catalyst and the mixture was stirred for 22 hours to effect the reaction. Following reaction completion, methanol was added to stop the reaction, after which the methanol and methylene chloride were distilled off in a vacuum.

The resulting crude polymer was dissolved in water and neutralized with an ion-exchange resin (Amberlite IRC-76, produced by Organo Corporation). The ion-exchange resin was separated from the polymer solution by filtration, following which the water was removed from the solution by distillation in a vacuum.

The resulting polyglycidol was analyzed by GPC using 0.1 M saline as the mobile phase, and the polyethylene glycol equivalent weight-average molecular weight was measured. The crystallinity was determined by wide-angle x-ray diffraction analysis, and the room temperature state of the polymer was visually examined. The results are shown in Table 4.

Syntheses Examples 10 and 11

Using the quantities, reaction time and temperature shown in Table 3, polyglycidol was prepared in each example by the same method as in Synthesis Example 9. In addition, glycerol was used in Synthesis Example 10, and ethanolamine in Synthesis Example 11, as the active hydrogen compound.

The resulting polyglycidol was analyzed by GPC using 0.1 M saline as the mobile phase, and the polyethylene glycol equivalent weight-average molecular weight was measured. The crystallinity was determined by wide-angle x-ray diffraction analysis, and the room temperature state of the polymer was visually examined. The results are shown in Table 4.

TABLE 3

|  | Solvent | Active hydrogen compound | Amount of KOH charged (pbw) | Temp. (° C.) | Reaction time (hrs) |
|---|---|---|---|---|---|
|  |  | (pbw) |  |  |  |
| Syn. Ex. 9 | methylene chloride | none | — | 20 | 20 | 22 |
| Syn. Ex. 10 | methylene chloride | glycerol | 2 | 5.5 | 20 | 24 |
| Syn. Ex. 11 | methylene chloride | ethanol-amine | 2 | 2 | 10 | 48 |

TABLE 4

| | Weight-average molecular weight | Crystallinity | Room temperature state |
|---|---|---|---|
| Syn. Ex. 9 | 1,100 | amorphous | viscous liquid |
| Syn. Ex. 10 | 1,020 | amorphous | viscous liquid |
| Syn. Ex. 11 | 1,140 | amorphous | viscous liquid |

Synthetic Example 12
Cyanoethylation of Polyglycidol

Three parts of the polyglycidol prepared in Synthesis Example 9 was mixed with 20 parts of dioxane and 14 parts of acrylonitrile. To this mixed solution was added aqueous sodium hydroxide comprising 0.16 part of sodium hydroxide dissolved in 1 part by weight of water, and stirring was carried out for 10 hours at 25° C. to effect the reaction. After reaction completion, 20 parts of water was added to the mixture, which was then neutralized using an ion-exchange resin (Amberlite IRC-76, produced by Organo Corporation). The ion-exchange resin was separated off by filtration, after which 50 parts of acetone was added to the solution and the insolubles were filtered off. The filtrate was vacuum concentrated, yielding crude cyanoethylated polyglycidol. This crude cyanoethylated polyglycidol was dissolved in acetone and the solution was filtered using 5A filter paper, following which the polyglycidol was precipitated out of solution in water and the precipitate was collected. These two operations (dissolution in acetone, and precipitation in water) were repeated twice, following which the product was dried in vacuo at 50° C., giving purified cyanoethylated polyglycidol.

The infrared absorption spectrum of the pure cyanoethylated polyglycidol showed no hydroxyl group absorption, indicating that all the hydroxyl groups had been substituted with cyanoethyl groups. Wide-angle x-ray diffraction analysis to determine the crystallinity showed that the product was amorphous at room temperature. In addition, the room temperature state of the polyglycidol was visually examined. The results are shown in Table 5.

Synthesis Example 13
Cyanoethylation of Polyglycidol

Pure cyanoethylated polyglycidol was prepared by the same method as in Synthesis Example 12 using the polyglycidol prepared in Synthesis Example 1.

The infrared absorption spectrum of the pure cyanoethylated polyglycidol showed no hydroxyl group absorption, indicating that all the hydroxyl groups had been substituted with cyanoethyl groups. Wide-angle x-ray diffraction analysis to determine the crystallinity showed that the product was amorphous at room temperature. In addition, the room temperature state was visually examined. The results are shown in Table 5.

Synthesis Example 14
Cyanoethylation of Polyglycidol

Pure cyanoethylated polyglycidol was prepared by the same method as in Synthesis Example 12 using the polyglycidol obtained in Synthesis Example 8.

The infrared absorption spectrum of the pure cyanoethylated polyglycidol showed no hydroxyl group absorption, indicating that all the hydroxyl groups had been substituted with cyanoethyl groups. Wide-angle x-ray diffraction analysis to determine the crystallinity showed that the product was amorphous at room temperature. In addition, the room temperature state was visually examined. The results are shown in Table 5.

Synthesis Example 15
Cyanoethyl-trimethylsilylation of Polyglycidol

Three parts of the polyglycidol prepared in Synthesis Example 1 was mixed with 20 parts of dioxane and 14 parts of acrylonitrile. To this mixed solution was added aqueous sodium hydroxide comprising 0.16 part of sodium hydroxide dissolved in 1 part of water, and stirring was carried out for 5 hours at 25° C. to effect the reaction. After reaction completion, 20 parts of water was added to the mixture, which was then neutralized using an ion-exchange resin (Amberlite IRC-76, produced by Organo Corporation). The ion-exchange resin was separated off by filtration, after which 50 parts of acetone was added to the solution and the insolubles were filtered off. The filtrate was vacuum concentrated, yielding crude cyanoethylated polyglycidol. One part of this crude cyanoethylated polyglycidol was dissolved in dimethylacetamide, following which 2 parts of bis(trimethylsilyl)acetamide was added to the solution, and stirring carried out at room temperature for 5 hours. The reaction mixture was cooled in an ice-water bath, and poured into a methanol/water (4:1) solution that had been cooled to 0° C. The precipitate that settled out was collected by filtration, then dissolved in acetamide. The resulting solution was passed through 5C filter paper, then dried in vacuo, yielding cyanoethyl-trimethylsilylated polyglycidol.

The infrared absorption spectrum of the cyanoethyl-trimethylsilylated polyglycidol showed no hydroxyl group absorption. Results from elemental analysis indicated that the proportion of hydroxyl groups which had been cyanoethylated was 87%, and that the remaining 13% of hydroxyl groups had been trimethylsilylated. Wide-angle x-ray diffraction analysis to determine the crystallinity showed that the product was amorphous at room temperature. In addition, the room temperature state was visually examined. The results are shown in Table 5.

Synthesis Example 16
Acetylation of Polyglycidol

One part of the polyglycidol prepared in Synthesis Example 1 was mixed with 30 parts of acetic acid and 30 parts of methylene chloride. To this mixed solution was added 0.4 part of a 60% perchloric acid solution in water and 40 parts of acetic anhydride, and stirring was carried out at room temperature for 8 hours. The reaction mixture was poured into cold water, and the precipitate that settled out was collected. The precipitate was dissolved in acetone and poured once again into water, then neutralized by adding sodium hydrogen carbonate and subsequently filtered with 5C filter paper. The precipitate was collected, placed together with water in dialysis tubing, and dialyzed for 3 days with ion-exchanged water. The resulting precipitate was collected, rinsed with water and dried in vacuo, yielding acetylated polyglycidol.

The infrared absorption spectrum of the acetylated polyglycidol showed no hydroxyl group absorption. However, an absorption peak attributable to C=O group was observed, indicating that all the hydroxyl groups had been acetylated. Wide-angle x-ray diffraction analysis to determine the crystallinity showed that the product was amorphous at room temperature. In addition, the room temperature state was visually examined. The results are shown in Table 5.

Synthesis Example 17
Cyanobenzoylation of Polyglycidol

The polyglycidol prepared in Synthesis Example 1 (0.4 part) was mixed with dioxane (10 parts by weight), following which pyridine (1.24 parts) was added. To this was added dropwise a solution of cyanobenzoyl chloride (2.05 parts) in dioxane (10 parts). The solution was set at a temperature of 80° C. and reacted for 12 hours. The reaction mixture was poured into a methanol/water (3:4) solution and the precipitate that settled out was collected. The precipitate was dissolved in N,N-dimethylsulfoxide, the resulting solution was placed in dialysis tubing, and dialysis was carried out for 3 days with ion-exchanged water. The resulting precipitate was collected, rinsed with water and dried in vacuo, yielding cyanobenzoylated polyglycidol.

The infrared absorption spectrum of the cyanobenzoylated polyglycidol showed no hydroxyl group absorption. However, absorption peaks attributable to C=O and C≡N groups were observed, indicating that all the hydroxyl groups had been cyanobenzoylated. Wide-angle x-ray diffraction analysis to determine the crystallinity showed that the product was amorphous at room temperature. In addition, the room temperature state was visually examined. The results are shown in Table 5.

TABLE 5

| | Starting polyglycidol (weight-average molecular weight) | Capping moiety introduced onto terminal hydroxyl groups of polyglycidol | Crystallinity | Room temperature state |
|---|---|---|---|---|
| Syn. Ex. 12 | Syn. Ex. 9 (1,100) | cyanoethyl | amorphous | viscous liquid |
| Syn. Ex. 13 | Syn. Ex. 1 (6,250) | cyanoethyl | amorphous | soft, paste-like solid |
| Syn. Ex. 14 | Syn. Ex. 8 (21,530) | cyanoethyl | amorphous | soft, paste-like solid |
| Syn. Ex. 15 | Syn. Ex. 1 (6,250) | cyanoethyl + trimethylsilyl | amorphous | soft, paste-like solid |
| Syn. Ex. 16 | Syn. Ex. 1 (6,250) | acetyl | amorphous | soft, paste-like solid |
| Syn. Ex. 17 | Syn. Ex. 1 (6,250) | cyanobenzoyl | amorphous | soft, paste-like solid |

Examples 1 to 3
Preparation of Solid Polymer Electrolyte (1)

A polymer (polyglycidol or polyglycidol derivative) and lithium perchlorate were dissolved in tetrahydrofuran in the respective combinations shown under Examples 1 to 3 in Table 6. In each example, the resulting solution was held in a vacuum to allow the tetrahydrofuran to evaporate. Predetermined amounts of polyethylene glycol dimethacrylate (number of oxyethylene units=9) and methoxypolyethylene glycol monomethacrylate (number of oxyethylene units=9). Azobisisobutyronitrile was also added, and the ingredients were admitted into a reactor such that the combined weight thereof (lithium perchlorate, polyglycidol or polyglycidol derivative, polyethylene glycol dimethacrylate, methoxypolyethylene glycol monomethacrylate and azobisisobutyronitrile) was 1 kilogram per mole of lithium perchlorate, thereby obtaining a polymer electrolyte composition.

The composition obtained in each example was placed between two copper plates spaced a gap of 200 microns, heated to 100° C. and held in that state for one hour to effect curing, thereby obtaining a solid polymer electrolyte. The electrical conductivity of the resulting film was determined by the AC impedance measurement technique. Wide-angle x-ray diffraction measurement of the solid polymer electrolyte obtained after curing was carried out to determine the crystallinity, and the room temperature state was visually examined. The solid polymer electrolyte was then held at 100° C. for 5 hours, following which the weight loss on evaporation was measured. The results are given in Table 6.

Examples 4 to 6
Preparation of Solid Polymer Electrolyte (2)

A polymer (polyglycidol or polyglycidol derivative) and lithium perchlorate were dissolved in tetrahydrofuran in the respective combinations shown under Examples 4 to 6 in Table 6. In each example, the resulting solution was held in a vacuum to allow the tetrahydrofuran to evaporate. Next, there was added a predetermined amount of a polyurethane crosslinking agent prepared by mixing together liquid polyol and liquid isocyanate. The liquid polyol was a glycerol-based copolymeric polyol of ethylene oxide and polyethylene oxide in a ratio of 8/2 having a hydroxyl number of 1.215 mg/kg. The liquid isocyanate was polyisocyanate having an isocyanate value of 7.381 mg/kg.

These ingredients were admitted into a reactor such that the combined weight thereof (lithium perchlorate, polyglycidol or polyglycidol derivative, liquid polyol and liquid isocyanate) was 1 kilogram per mole of lithium perchlorate, thereby obtaining a polymer electrolyte composition.

The composition obtained in each example was placed between two copper plates spaced a gap of 200 microns, heated to 100° C. and held in that state for 5 hours to effect curing, thereby obtaining a solid polymer electrolyte. The electrical conductivity of the resulting film was determined by AC impedance measurement. Wide-angle x-ray diffraction measurement of the solid polymer electrolyte obtained after curing was carried out to determine the crystallinity, and the room temperature state was visually examined. The solid polymer electrolyte was then held at 100° C. for 5 hours, following which the weight loss on evaporation was measured. The results are given in Table 6.

Comparative Example 1

A polyethylene glycol-lithium perchlorate complex (polymer electrolyte composition) was prepared by the same method as in Example 1, except that polyethylene glycol having a molecular weight of 200 was used instead of the polymer (polyglycidol or polyglycidol derivative), and crosslinking reaction was not carried out.

The resulting complex was placed between two copper plates spaced a gap of 200 microns, and the electrical conductivity was determined by AC impedance measurement. Wide-angle x-ray diffraction measurement of the complex was carried out to determine the crystallinity, and the room temperature state was visually examined. The complex was then held at 100° C. for 5 hours, following which the weight loss on evaporation was measured. The results are given in Table 7.

Comparative Example 2

A polyethylene glycol-lithium perchlorate complex (polymer electrolyte composition) was prepared by the same method as in Example 1, except that polyethylene glycol having a molecular weight of 2,000 was used instead of the polymer (polyglycidol or polyglycidol derivative), and crosslinking reaction was not carried out.

The resulting complex was placed between two copper plates spaced a gap of 200 microns, and the electrical conductivity was determined by AC impedance measurement. Wide-angle x-ray diffraction measurement of the complex obtained was carried out to determine the crystallinity, and the room temperature state was visually examined. The complex was then held at 100° C. for 5 hours, following which the weight loss on evaporation was measured. The results are given in Table 7.

Comparative Example 3

A polyethylene glycol-lithium perchlorate complex (polymer electrolyte composition) was prepared by the same method as in Example 1, except that polyethylene glycol having a molecular weight of 2,000 was used instead of the polymer (polyglycidol or polyglycidol derivative), and the crosslinking agent shown in Table 7 was used.

The resulting complex was placed between two copper plates spaced a gap of 200 microns, and the electrical conductivity was determined by AC impedance measurement. Wide-angle x-ray diffraction measurement of the complex obtained was carried out to determine the crystallinity, and the room temperature state was visually examined. The complex was then held at 100° C. for 5 hours, following which the weight loss on evaporation was measured. The results are given in Table 7.

TABLE 7-continued (Amounts are in parts by weight)

|  | Comparative examples | | |
|---|---|---|---|
|  | 1 | 2 | 3 |
| Room temperature state | L | S | S |
| weight loss on evaporation (%) | ≦0.1 | ≦0.1 | ≦0.1 |

As is apparent from the results in the above examples, according to the present invention there can be obtained both ion-conductive polymer electrolyte compositions having high ionic conductivity and also solid polymer electrolytes having excellent shape retention and ionic conductivity.

What is claimed is:

1. An ion-conductive polymer electrolyte composition comprising:

TABLE 6

(Amounts are in parts by weight)

|  |  | Examples | | | | | |
|---|---|---|---|---|---|---|---|
|  |  | 1 | 2 | 3 | 4 | 5 | 6 |
| Polymer | Syn. Ex. 9 | 1 |  |  | 1 |  |  |
|  | Syn. Ex. 10 |  | 1 |  |  | 1 |  |
|  | Syn. Ex. 14 |  |  | 1 |  |  | 1 |
|  | PEG 200 |  |  |  |  |  |  |
|  | PEG 2000 |  |  |  |  |  |  |
| Crosslinking agent 1 |  | 0.2 | 0.3 | 0.2 |  |  |  |
| Crosslinking agent 2 |  | 0.2 | 0.3 | 0.3 |  |  |  |
| Crosslinking agent 3 |  |  |  |  | 0.17 | 0.256 | 0.256 |
| Crosslinking agent 4 |  |  |  |  | 0.03 | 0.044 | 0.044 |
| Crosslinking reaction |  | heat | heat | heat | heat | heat | heat |
| Electrical conductivity (S/cm) |  | $1.5 \times 10^{-4}$ | $6.0 \times 10^{-4}$ | $9.2 \times 10^{-5}$ | $1.7 \times 10^{-4}$ | $6.6 \times 10^{-4}$ | $1.3 \times 10^{-4}$ |
| Crystallinity |  | amorphous | amorphous | amorphous | amorphous | amorphous | amorphous |
| Room temperature state |  | S | S | S | S | S | S |
| Weight loss on evaporation (%) |  | ≦0.1 | ≦0.1 | ≦0.1 | ≦0.1 | ≦0.1 | ≦0.1 |

Crosslinking agent 1: Polyethylene glycol dimethacrylate
Crosslinking agent 2: Methoxypolyethylene glycol monomethacrylate
Crosslinking agent 3: Ethylene oxide-polyethylene oxide copolymeric polyol
Crosslinking agent 4: Polyisocyanate
Room temperature state
S: soft, paste-like solid
L: viscous liquid

TABLE 7

(Amounts are in parts by weight)

|  |  | Comparative examples | | |
|---|---|---|---|---|
|  |  | 1 | 2 | 3 |
| Polymer | Syn. Ex. 9 |  |  |  |
|  | Syn. Ex. 10 |  |  |  |
|  | Syn. Ex. 14 |  |  |  |
|  | PEG 200 | 1 |  |  |
|  | PEG 2000 |  | 1 | 1 |
| Crosslinking agent 1 |  |  |  | 0.3 |
| Crosslinking agent 2 |  |  |  | 0.3 |
| Crosslinking agent 3 |  |  |  |  |
| Crosslinking agent 4 |  |  |  |  |
| Crosslinking reaction |  | — | — | heat |
| Electrical conductivity (S/cm) |  | $9.0 \times 10^{-5}$ | $8.0 \times 10^{-7}$ | $3.0 \times 10^{-7}$ |
| Crystallinity |  | amorphous | crystalline | crystalline |

(A) a polymeric compound containing a unit of the following formula (1) and a unit of the following formula (2):

(1)

(2)

(B) an ion-conductive salt, and
(C) a compound having two or more reactive double bonds.

2. An ion-conductive solid polymer electrolyte prepared from a composition comprising:
(A) a polymeric compound containing a unit of the following formula (1) and a unit of the following formula (2):

(1)

(2)

(B) an ion-conductive salt, and
(C) a compound having two or more reactive double bonds;
wherein the polymer electrolyte has a semi-interpenetrating polymer network structure in which molecular chains on the polymeric compound (A) are entangled with a three-dimensional polymer network structure formed by crosslinking the compound having two or more reactive double bonds (C), and contains the ion-conductive salt (B).

3. A lithium-type secondary cell, wherein said cell comprises the ion-conductive solid polymer electrolyte of claim 2.

4. The ion-conductive polymer electrolyte composition of claim 1, wherein said compound having two or more reactive double bonds is a member selected from the group consisting of trimethylolpropane trimethacrylate and a compound of formula (3)

(3)

wherein $R^3$, $R^4$, and $R^5$ are each independently methyl, ethyl, n-propyl, i-propyl, s-butyl, or t-butyl and the sum of X and Y is 1 to 30.

5. The ion-conductive solid polymer electrolyte of claim 2, wherein said compound having two or more reactive double bonds is a member selected from the group consisting of trimethylolpropane trimethacrylate and a compound of formula (3)

(3)

wherein $R^3$, $R^4$, and $R^5$ are each independently methyl, ethyl, n-propyl, i-propyl, s-butyl, or t-butyl and the sum of X and Y is 1 to 30.

6. The lithium-type secondary cell of claim 3, wherein said compound having two or more reactive double bonds is a member selected from the group consisting of trimethylolpropane trimethacrylate and a compound of formula (3)

(3)

wherein $R^3$, $R^4$, and $R^5$ are each independently methyl, ethyl, n-propyl, i-propyl, s-butyl, or t-butyl and the sum of X and Y is 1 to 30.

7. The ion-conductive polymer electrolyte composition of claim 4, wherein the compound of formula (3) is used in combination with a compound of formula (4)

(4)

wherein $R^6$, $R^7$, and $R^8$ are each independently methyl, ethyl, n-propyl, i-propyl, s-butyl, or t-butyl and the sum of A and B is 1 to 30.

8. The ion-conductive solid polymer electrolyte of claim 5, wherein the compound of formula (3) is used in combination with a compound of formula (4)

(4)

wherein $R^6$, $R^7$, and $R^8$ are each independently methyl, ethyl, n-propyl, i-propyl, s-butyl, or t-butyl and the sum of A and B is 1 to 30.

9. The lithium-type secondary cell of claim 6, wherein the compound of formula (3) is used in combination with a compound of formula (4)

(4)

wherein $R^6$, $R^7$, and $R^8$ are each independently methyl, ethyl, n-propyl, i-propyl, s-butyl, or t-butyl and the sum of A and B is 1 to 30.

10. The ion-conductive polymer electrolyte composition of claim 1, wherein the polymeric compound (A) is prepared by polymerizing either glycidol or 3-chloro-1,2-propanediol with a basic catalyst and an alcoholic compound or with a Lewis acid catalyst.

11. The ion-conductive solid polymer electrolyte of claim 2, wherein the polymeric compound (A) is prepared by polymerizing either glycidol or 3-chloro-1,2-propanediol with a basic catalyst and an alcoholic compound or with a Lewis acid catalyst.

12. The ion-conductive solid polymer electrolyte of claim 1, wherein the polymeric compound is prepared by polymerizing either glycidol or 3-chloro-1,2-propanediol alone or by polymerizing either glycidol or 3-chloro-1,2-propanediol in the presence of an alcoholic compound selected from the group consisting of ethanol, methanol, isopropanol, benzyl alcohol, glycerol, pentaerythritol, sorbitol, diethylene glycol, and ethylene glycol.

13. The ion-conductive solid polymer electrolyte of claim 2, wherein the polymeric compound is prepared by polymerizing either glycidol or 3-chloro-1,2-propanediol alone or by polymerizing either glycidol or 3-chloro-1,2-propanediol by adding an alcoholic compound selected from the group consisting of ethanol, methanol, isopropanol, benzyl alcohol, glycerol, pentaerythritol, sorbitol, diethylene glycol, and ethylene glycol.

* * * * *